United States Patent
Ross et al.

(10) Patent No.: US 11,386,697 B2
(45) Date of Patent: Jul. 12, 2022

(54) OBJECT CHANGE DETECTION AND MEASUREMENT USING DIGITAL FINGERPRINTS

(71) Applicant: ALITHEON, INC., Bellevue, WA (US)

(72) Inventors: David Justin Ross, Bellevue, WA (US); William Charles Shannon, Bellevue, WA (US); Cheng Qian, Bellevue, WA (US)

(73) Assignee: ALITHEON, INC., Bellevue, WA (US)

( * ) Notice: Subject to any disclaimer, the term of this patent is extended or adjusted under 35 U.S.C. 154(b) by 0 days.

(21) Appl. No.: 17/189,470

(22) Filed: Mar. 2, 2021

(65) Prior Publication Data

US 2021/0209335 A1 Jul. 8, 2021

Related U.S. Application Data

(63) Continuation of application No. 16/780,882, filed on Feb. 3, 2020, now Pat. No. 10,963,670.

(Continued)

(51) Int. Cl.
G06K 9/00 (2006.01)
G06V 40/12 (2022.01)
G06V 40/13 (2022.01)

(52) U.S. Cl.
CPC ...... *G06V 40/1371* (2022.01); *G06V 40/1353* (2022.01); *G06V 40/1329* (2022.01)

(58) Field of Classification Search
CPC ........... G06K 9/00093; G06K 9/00073; G06K 9/00053; G06K 9/00577; G06K 9/6211;
(Continued)

(56) References Cited

U.S. PATENT DOCUMENTS 4,218,674 A 8/1980 Brosow et al.
4,423,415 A 12/1983 Goldman
(Continued)

FOREIGN PATENT DOCUMENTS

DE 102006005927 A1 8/2007
EP 0439669 A2 8/1991
(Continued)

OTHER PUBLICATIONS

Anonymous, "Intrinsic Characteristics for Authentication" & "Alp Vision Advances Security Through Digital Technology," Authentication News vol. 12, (No. 9) pp. 2, 7 and 8, dated Sep. 2006, 3 pages total.

(Continued)

*Primary Examiner* — Abhishek Sarma
(74) *Attorney, Agent, or Firm* — Cozen O'Connor (57) ABSTRACT

The present disclosure teaches a method of utilizing image "match points" to measure and detect changes in a physical object. In some cases "degradation" or "wear and tear" of the physical object is assessed, while in other applications this disclosure is applicable to measuring intentional changes, such as changes made by additive or subtractive manufacturing processes, which may, for example, involve adding a layer or removing a layer by machining. A system may include a scanner, and a digital fingerprinting process, coupled to an object change computer server. The server is coupled to a datastore that stores class digital fingerprints, selected object digital fingerprints collected over time, match measurements, and deterioration metrics.

24 Claims, 5 Drawing Sheets

Related U.S. Application Data (60) Provisional application No. 62/802,177, filed on Feb. 6, 2019.

(58) Field of Classification Search
CPC ............... G06K 9/6255; G06K 9/6215; G06V 40/1371; G06V 40/1353; G06V 40/1329; G06V 10/757; G06V 20/66; G06V 20/80
See application file for complete search history.

(56) References Cited

U.S. PATENT DOCUMENTS

| | | |
|---|---|---|
| 4,677,435 A | 6/1987 | Causse et al. |
| 4,921,107 A | 5/1990 | Hofer |
| 5,031,223 A | 7/1991 | Rosenbaum et al. |
| 5,079,714 A | 1/1992 | Manduley et al. |
| 5,393,939 A | 2/1995 | Nasuta et al. |
| 5,422,821 A | 6/1995 | Allen et al. |
| 5,514,863 A | 5/1996 | Williams |
| 5,518,122 A | 5/1996 | Tilles et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels et al. |
| 6,360,001 B1 | 3/2002 | Berger et al. |
| 6,370,259 B1 | 4/2002 | Hobson et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,697,500 B2 | 2/2004 | Woolston et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,961,466 B2 | 11/2005 | Imagawa et al. |
| 6,985,925 B2 | 1/2006 | Ogawa |
| 6,985,926 B1 | 1/2006 | Ferlauto et al. |
| 7,016,532 B2 | 3/2006 | Boncyk et al. |
| 7,096,152 B1 | 8/2006 | Ong |
| 7,121,458 B2 | 10/2006 | Avant et al. |
| 7,171,049 B2 | 1/2007 | Snapp |
| 7,204,415 B2 | 4/2007 | Payne et al. |
| 7,212,949 B2 | 5/2007 | Bachrach |
| 7,477,780 B2 | 1/2009 | Boncyk et al. |
| 7,518,080 B2 | 4/2009 | Amato |
| 7,674,995 B2 | 3/2010 | Desprez et al. |
| 7,720,256 B2 | 5/2010 | Desprez et al. |
| 7,726,548 B2 | 6/2010 | Delavergne |
| 7,822,263 B1 | 10/2010 | Prokoski |
| 7,853,792 B2 | 12/2010 | Cowburn |
| 8,022,832 B2 | 9/2011 | Vogt et al. |
| 8,108,309 B2 | 1/2012 | Tan |
| 8,180,667 B1 | 5/2012 | Baluja et al. |
| 8,194,938 B2 | 6/2012 | Wechsler et al. |
| 8,374,399 B1 | 2/2013 | Talwerdi |
| 8,374,920 B2 | 2/2013 | Hedges et al. |
| 8,391,583 B1 | 3/2013 | Mennie et al. |
| 8,428,772 B2 | 4/2013 | Miette et al. |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 | 8/2013 | Spitzig et al. |
| 8,526,743 B1 | 9/2013 | Campbell et al. |
| 8,774,455 B2 | 7/2014 | Elmenhurst et al. |
| 9,031,329 B1 | 5/2015 | Farid et al. |
| 9,058,543 B2 | 6/2015 | Campbell et al. |
| 9,152,862 B2 | 10/2015 | Ross et al. |
| 9,170,654 B2 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,552 B2 | 5/2016 | Elmenhurst et al. |
| 9,350,714 B2 | 5/2016 | Freeman et al. |
| 9,361,596 B2 | 6/2016 | Ross et al. |
| 9,443,298 B2 | 9/2016 | Ross et al. |
| 9,558,463 B2 | 1/2017 | Ross et al. |
| 9,582,714 B2 | 2/2017 | Ross et al. |
| 9,646,206 B2 | 5/2017 | Ross et al. |
| 9,741,724 B2 | 8/2017 | Seshadri et al. |
| 10,037,537 B2 | 7/2018 | Withrow et al. |
| 10,043,073 B2 | 8/2018 | Ross et al. |
| 10,192,140 B2 | 1/2019 | Ross et al. |
| 10,199,886 B2 | 2/2019 | Li et al. |
| 10,346,852 B2 | 7/2019 | Ross et al. |
| 10,540,664 B2 | 1/2020 | Ross et al. |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1 | 6/2002 | Dutta |
| 2002/0168090 A1 | 11/2002 | Bruce et al. |
| 2003/0015395 A1 | 1/2003 | Hallowell et al. |
| 2003/0046103 A1 | 3/2003 | Amato et al. |
| 2003/0091724 A1 | 5/2003 | Mizoguchi |
| 2003/0120677 A1 | 6/2003 | Vernon |
| 2003/0179931 A1 | 9/2003 | Sun |
| 2003/0182018 A1 | 9/2003 | Snapp |
| 2003/0208298 A1 | 11/2003 | Edmonds |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |
| 2004/0218801 A1 | 11/2004 | Houle et al. |
| 2005/0007776 A1 | 1/2005 | Monk et al. |
| 2005/0065719 A1 | 3/2005 | Khan et al. |
| 2005/0086256 A1 | 4/2005 | Owens et al. |
| 2005/0111618 A1 | 5/2005 | Sommer et al. |
| 2005/0119786 A1 | 6/2005 | Kadaba |
| 2005/0131576 A1 | 6/2005 | De et al. |
| 2005/0137882 A1 | 6/2005 | Cameron et al. |
| 2005/0160271 A9 | 7/2005 | Brundage et al. |
| 2005/0169529 A1 | 8/2005 | Owechko et al. |
| 2005/0188213 A1 | 8/2005 | Xu |
| 2005/0204144 A1 | 9/2005 | Mizutani |
| 2005/0251285 A1 | 11/2005 | Boyce et al. |
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0083414 A1 | 4/2006 | Neumann et al. |
| 2006/0109520 A1 | 5/2006 | Gossaye et al. |
| 2006/0131518 A1 | 6/2006 | Ross et al. |
| 2006/0177104 A1 | 8/2006 | Prokoski |
| 2006/0253406 A1 | 11/2006 | Caillon |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0230656 A1 | 10/2007 | Lowes et al. |
| 2007/0263267 A1 | 11/2007 | Ditt |
| 2007/0282900 A1 | 12/2007 | Owens et al. |
| 2008/0011841 A1 | 1/2008 | Self et al. |
| 2008/0128496 A1 | 6/2008 | Bertranou et al. |
| 2008/0130947 A1 | 6/2008 | Ross et al. |
| 2008/0219503 A1 | 9/2008 | Di et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |

(56) References Cited

U.S. PATENT DOCUMENTS

| | | |
|---|---|---|
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos |
| 2009/0271029 A1 | 10/2009 | Doutre |
| 2009/0287498 A2 | 11/2009 | Choi |
| 2009/0307005 A1 | 12/2009 | Omartin et al. |
| 2010/0027834 A1 | 2/2010 | Spitzig et al. |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2011/0026831 A1 | 2/2011 | Perronnin et al. |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0267192 A1 | 11/2011 | Goldman et al. |
| 2012/0042171 A1 | 2/2012 | White et al. |
| 2012/0089639 A1 | 4/2012 | Wang |
| 2012/0130868 A1 | 5/2012 | Loeken |
| 2012/0177281 A1 | 7/2012 | Frew |
| 2012/0185393 A1 | 7/2012 | Atsmon et al. |
| 2012/0199651 A1 | 8/2012 | Glazer |
| 2012/0242481 A1 | 9/2012 | Gernandt et al. |
| 2012/0243797 A1 | 9/2012 | Di Venuto Dayer et al. |
| 2012/0250945 A1 | 10/2012 | Peng et al. |
| 2013/0214164 A1 | 8/2013 | Zhang et al. |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0140571 A1 | 5/2014 | Elmenhurst et al. |
| 2014/0184843 A1 | 7/2014 | Campbell et al. |
| 2014/0201094 A1 | 7/2014 | Herrington et al. |
| 2014/0270341 A1 | 9/2014 | Elmenhurst et al. |
| 2014/0314283 A1 | 10/2014 | Harding |
| 2014/0380446 A1 | 12/2014 | Niu et al. |
| 2015/0058142 A1 | 2/2015 | Lenahan et al. |
| 2015/0067346 A1 | 3/2015 | Ross et al. |
| 2015/0078629 A1 | 3/2015 | Gottemukkula et al. |
| 2015/0086068 A1 | 3/2015 | Mulhearn et al. |
| 2015/0117701 A1 | 4/2015 | Ross et al. |
| 2015/0127430 A1 | 5/2015 | Hammer |
| 2015/0248587 A1 | 9/2015 | Oami et al. |
| 2015/0294189 A1 | 10/2015 | Benhimane et al. |
| 2015/0309502 A1* | 10/2015 | Breitgand .......... G06Q 30/0185 700/98 |
| 2015/0347815 A1* | 12/2015 | Dante .................... G06F 16/51 382/191 |
| 2015/0371087 A1 | 12/2015 | Ross et al. |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0117631 A1 | 4/2016 | Mccloskey et al. |
| 2016/0162734 A1 | 6/2016 | Ross et al. |
| 2016/0180546 A1 | 6/2016 | Kim et al. |
| 2016/0189510 A1 | 6/2016 | Hutz |
| 2016/0335520 A1 | 11/2016 | Ross et al. |
| 2017/0004444 A1 | 1/2017 | Krasko et al. |
| 2017/0032285 A1 | 2/2017 | Sharma et al. |
| 2017/0132458 A1 | 5/2017 | Short et al. |
| 2017/0220901 A1* | 8/2017 | Klimovski ........... H04N 5/2256 |
| 2017/0243230 A1 | 8/2017 | Ross et al. |
| 2017/0243232 A1* | 8/2017 | Ross ................... G06F 16/5866 |
| 2017/0243233 A1 | 8/2017 | Land et al. |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1 | 11/2017 | Withrow et al. |
| 2017/0372327 A1 | 12/2017 | Withrow |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0047128 A1 | 2/2018 | Ross et al. |
| 2018/0053312 A1 | 2/2018 | Ross et al. |
| 2018/0121643 A1 | 5/2018 | Talwerdi et al. |
| 2018/0144211 A1 | 5/2018 | Ross et al. |
| 2018/0315058 A1 | 11/2018 | Withrow et al. |
| 2018/0349694 A1 | 12/2018 | Ross et al. |
| 2019/0026581 A1 | 1/2019 | Leizerson |
| 2019/0034694 A1* | 1/2019 | Ross ..................... G06F 16/583 |
| 2019/0102873 A1 | 4/2019 | Wang et al. |
| 2019/0228174 A1 | 7/2019 | Withrow et al. |
| 2019/0287118 A1 | 9/2019 | Ross et al. |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0257791 A1* | 8/2020 | Shannon ............... G06K 9/6211 |

FOREIGN PATENT DOCUMENTS

| | | |
|---|---|---|
| EP | 0759596 A2 | 2/1997 |
| EP | 1016548 A2 | 7/2000 |
| EP | 1719070 B1 | 4/2009 |
| EP | 2107506 A1 | 10/2009 |
| EP | 2166493 A1 | 3/2010 |
| EP | 2195621 B1 | 11/2013 |
| EP | 2866193 A1 | 4/2015 |
| EP | 2257909 B1 | 5/2015 |
| EP | 2869240 A2 | 5/2015 |
| EP | 2869241 A2 | 5/2015 |
| EP | 3208744 A1 | 8/2017 |
| EP | 3249581 A1 | 11/2017 |
| EP | 3270342 A1 | 1/2018 |
| EP | 3435287 A2 | 1/2019 |
| GB | 2097979 A | 11/1982 |
| GB | 2482127 A | 1/2012 |
| JP | 61234481 A | 10/1986 |
| JP | 2007213148 A | 8/2007 |
| KR | 20120009654 A | 2/2012 |
| WO | 2005086616 A2 | 9/2005 |
| WO | 2006038114 A1 | 4/2006 |
| WO | 2007028799 A1 | 3/2007 |
| WO | 2007031176 A1 | 3/2007 |
| WO | 2007071788 A1 | 6/2007 |
| WO | 2007090437 A1 | 8/2007 |
| WO | 2007144598 A1 | 12/2007 |
| WO | 2009030853 A1 | 3/2009 |
| WO | 2009089126 A1 | 7/2009 |
| WO | 2009115611 A2 | 9/2009 |
| WO | 2010018464 A2 | 2/2010 |
| WO | 2012145842 A1 | 11/2012 |
| WO | 2013126221 A1 | 8/2013 |
| WO | 2013173408 A1 | 11/2013 |
| WO | 2015004434 A1 | 1/2015 |
| WO | 2016081831 A1 | 5/2016 |

OTHER PUBLICATIONS

Beekhof et al., "Secure Surface Identification Codes," Proceeding of the SPIE 6819: Security Forensics, Steganography, and Watermarking of Multimedia Contents X:68190D, 2008. (12 pages).

Boa et al., "Local Feature based Multiple Object Instance Identification using Scale and Rotation Invariant Implicit Shape Model," 12th Asian Conference on Computer Vision, Singapore, Singapore, Nov. 1-5, 2014, pp. 600-614.

Buchanan et al., "Fingerprinting documents and packaging," Nature 436(7050): 475, 2005.

Cavoukian et al.; "Biometric Encryption: Technology for Strong Authentication, Security and Privacy, Office of the Information and Privacy Comm., Toronto, Canada," 2008, Int'l Fed lot Info Proc., vol. 261; Policies and Research in Identity Mgmt; pp. 57-77.

(56) References Cited

OTHER PUBLICATIONS

Di Paola et al., "An Autonomous Mobile Robotic System for Surveillance of Indoor Environments," International Journal of Advanced Robotic Systems 7(1 ): 19-26, 2010.

Drew, M. S., et al., "Sharpening from Shadows: Sensor Transforms for Removing Shadows using a Single Image," Color and Imaging Conference, vol. 5, Society for Imaging Science and Technology, 2009, pp. 267-271.

Ebay, "eBay Launches Must-Have !Phone App Red Laser 3.0" published Nov. 18, 2011; https://www .ebayinc.com/stories/news/ebay-launches-must-have-iphone-app-redlaser-30/, downloaded Mar. 21, 2019 7 pages).

Entrupy.com Website History, Wayback Machine; https://web.archive.org/web/20160330060808/https://www.entrupy.com/; Mar. 30, 2016 (Year: 2016) 2 pages.

Farid, "Digital Image Forensics," Lecture notes, exercises and matlab code, CS 89/189, Darmouth College, Hanover, New Hampshire, USA, 2013, 199 pages.

Fischler et al., "Random Sample Consensus: A Paradigm for Model Fitting with Applications to Image Analysis and Automated Cartography," Communication of the ACM 24(6); 381-395, 1981.

Huang et al., "A Novel Binarization Algorithm for Ballistic Imaging Systems," 3rd International Congress on Image and Signal Processing, Yantai, China, Oct. 16-18, 2010, pp. 1287-1291.

Huang et al., "An Online Ballistics Imaging System for Firearm Identification," 2nd International Conference on Signal Processing Systems, Dalian, China, Jul. 5-7, 2010, vol. 2, pp. 68-72.

Kartik et al., "Security System with Face Recognition, SMS Alert and Embedded Network Video Monitoring Terminal," International Journal of Security, Privacy and Trust Management 2(5):9-19, 2013.

Li, "Firearm Identification System Based on Ballistics Image Processing," Congress on Image and Signal Processing, Sanya, China, May 27-30, 20081, pp. 149-154.

Li, "Image Processing for the Positive Identification of Forensic Ballistics Specimens," Proceedings of the 6th International Conference of Information Fusion, Cairns, Australia, Jul. 8-11, 2003, pp. 1494-1498.

Maddern et al., "Illumination Invariant Imaging: Applications in Robust Vision-based Localisation, Mapping and Classification for Autonomous Vehicles," IEEE International Conference on Robotics and Automation, Hong Kong, China, May 31-Jun. 7, 2014, 8 pp.

Matsumoto et al., "Nano-artifact metrics base don random collapse of resist," Scientific Reports 4:6142, 2014 (5 pages).

Mistry et al., "Comparison of Feature Detection and Matching Approaches: SIFT and SURF," Global Research and Development Journal for Engineering, vol. 2, Issue 4, Mar. 2017, 8 pages.

Online NCOALink ® Processing Acknowledgement Form (PAF) Released by Lorton Data, Jun. 2, 2009, URL=http://us.generation-nt.com/online-ncoalink-processing-acknowledgement-form-paf-released-by-press-1567191.html, download date Jun. 25, 2010, 1 page.

Rublee et al., "ORB: an efficient alternative to SIFT or SURF," IEEE International Conference on Computer Vision, Barcelona, Spain, Nov. 6-13, 2011, 8 pages.

Schneider et al., "A Robust Content Based Digital Signature for Image Authentication," Proceeding of the International Conference on Image Processing Lausanne, Switzerland, Sep. 19, 1996, pp. 227-230.

Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.

Shi et al., "Smart Cameras: Fundamentals and Classification," Chapter 2, Belbachir (ed.), Smart Cameras, Springer, New York, New York, USA 2010, pp. 19-34.

Shields, "How To Shop Savvy With Red Laser," published online on Mar. 22, 2010; https://iphone.appsstomn.net/reviews/lifestyle/how-to-shop-savvy-with-redlaser/, downloaded Mar. 22, 2010 8 pages.

Smith, "Fireball: A Forensic Ballistic Imaging System: Proceedings of the 3pt Annual International Carnahan Conference on Security Technology," Canberra, Australia, Oct. 15-17, 1997, pp. 64-70.

Takahashi et al., "Mass-produced Parts Traceability System Based on Automated Scanning of "Fingerprint of Things,"" 15th IAPR International Conference on Machine Vision Applications, Nagoya, Japan, May 3-12, 2017, 5 pages.

United States Postal Service, "NCOALink ® Systems," URL=http://www.usps.com/ncsc/addressservices/moveupdate/changeaddress.htm, download date Jun. 23, 2010, 2 pages.

United States Postal Service, "Postal Addressing Standards," Publication Jul. 28, 2008, 55 pages.

United States Postal Services, NCOALink® Systems, dated May 27, 2009, URL=http://ribbs.usps.gov/ncoalink/ncoalink_print.htm, download date Jun. 23, 2010, 3 pages.

Veena et al., "Automatic Theft Security System (Smart Surveillance Camera)," Computer Science & Information Technology 3:75-87, 2013.

Woods, "Counterfeit-spotting truth machine launches out of Dumbo," published online on Feb. 11, 2016, downloaded from http:/ltechnically/brooklyn/2016/02/11/entrupy-counterfeit-scanner/ on Mar. 20, 2019, 3 pages.

\* cited by examiner

FIG. 5 USING CLASS PRINT

OBJECT CHANGE DETECTION AND MEASUREMENT USING DIGITAL FINGERPRINTS

This application is a Continuation of U.S. application Ser. No. 16/780,882, filed Feb. 3, 2020 (ref 680-US), which is a non-provisional of and claims priority, pursuant to 35 U.S.C. § 119(e), to U.S. Application No. 62/802,177, filed Feb. 6, 2019 (ref 680-P), both of which are hereby incorporated by reference as though fully set forth.

COPYRIGHT NOTICE

© Alitheon, Inc. 2019-2020. A portion of the disclosure of this patent document contains material which is subject to copyright protection. The copyright owner has no objection to the facsimile reproduction by anyone of the patent document or the patent disclosure, as it appears in the Patent and Trademark Office patent file or records, if and when they are made public, but otherwise reserves all copyright rights whatsoever. 37 CFR § 1.71(d).

FIELD OF THE DISCLOSURE

This application pertains to methods, systems, and software for detecting and measuring changes over time to physical objects, through the use of digital fingerprints.

BACKGROUND OF THE DISCLOSURE

It is often necessary or desirable to determine whether or not a physical object has changed from a prior state and, in certain cases, to determine how much a physical object has changed from a prior state. The need remains to reliably identify objects, detect and measure changes in the object over time, and from those changes assess authenticity, provenance, quality, condition, and/or degradation over time.

SUMMARY OF THE DISCLOSURE

The following is a summary of the present disclosure to provide a basic understanding of some features and context. This summary is not intended to identify key or critical elements of the disclosure or to delineate the scope of the disclosure. Its sole purpose is to present some concepts of the present disclosure in simplified form as a prelude to a more detailed description that is presented later.

In one embodiment, a system comprises a combination of digital fingerprint techniques, processes, programs, and hardware to enable a method of utilizing image "match points" to measure and detect changes in a physical object. In some cases "degradation" or "wear and tear" of the physical object is assessed, while in other applications this disclosure is applicable to measuring intentional changes, such as changes made by additive or subtractive manufacturing processes, which may, for example, involve adding a layer or removing a layer by machining. A system may include a scanner, and a digital fingerprinting process, coupled to an object change computer server. The object change computer server may be coupled to a datastore that stores class digital fingerprints, selected object digital fingerprints collected over time, match measurements, and deterioration metrics.

Additional aspects and advantages of the present disclosure will be apparent from the Detailed Description, which proceeds with reference to the accompanying drawings.

BRIEF DESCRIPTION OF THE DRAWINGS

To enable the reader to realize one or more of the above-recited and other advantages and features of the present disclosure, a more particular description follows by reference to specific embodiments thereof which are illustrated in the appended drawings. Understanding that these drawings depict only typical embodiments of the disclosure and are not therefore to be considered limiting of its scope, the present disclosure will be described and explained with additional specificity and detail through the use of the accompanying drawings in which.

DETAILED DESCRIPTION OF ONE OR MORE EMBODIMENTS

It is often necessary or desirable to determine whether or not a physical object has changed from a prior state and, in certain cases, to determine how much a physical object has changed from a prior state. The present disclosure teaches a method of utilizing image "match points" to measure and detect changes in a physical object. While some aspects of the results presented herein may be achieved by examining changes in images that are not changes in match points, existing image-based approaches are significantly less general (for additive as well as subtractive processes, for example), and thus more limited, than the methods taught in this disclosure.

In this disclosure, frequent reference is made to "degradation" or "wear and tear" but the teachings of this disclosure are equally applicable to measuring intentional changes, such as changes made by additive manufacturing processes, which may, for example, involve adding a layer or removing a layer by machining, and any other processes that result in changes to the state of an object.

One aspect of this disclosure is the use of measured changes in a digital fingerprint of an object as a measure of its actual change from its initial conditions, or any prior condition. The techniques are primarily described in relation to measuring wear and tear and determining that an object should be replaced, but the techniques described here also have applicability in measuring the effects of other changes such as the effectiveness of anodizing a surface or an additive manufacturing process in, for example, adding a layer or a feature to an object under construction—or to any occurrence that results in a change in or to the material substance of a physical object. The methods taught in the present disclosure may also be applied to the grading of objects, such as of a coin, based on a degradation of the object from a standard. One application of the taught method is determining when a currency note has degraded to a such degree that it needs to be recycled.

As will be shown, the measured degradation may be from a digital fingerprint created at an earlier stage of the object itself or from a standard representative of the kind (class) of object being measured, or by other means. This standard may be, for example, a particular object, a physical or digital model, or it may be an aggregate of many objects of the same class. The concept of measured degradation will be further elaborated below.

During the creation and/or use of various physical goods, it is often necessary or desirable to determine that a physical good or object has changed from some prior state—and to determine how much it has changed or in what manner it has changed. This disclosure teaches a method for using digital fingerprints to determine and measure various object changes in a wide range of physical objects and under a range of conditions. Examples will be given where the change is one of wear-and-tear, corrosion, ablation, or other essentially subtractive processes—where the surface elements are gradually removed. Equally important are changes to the surface that occur through additive processes, such as a step in an additive manufacturing process, or a person's addition of makeup to his or her face. The additive conditions, the subtractive conditions, and conditions where both addition and subtraction take place at the same time or in succession (e.g. abrasion, corrosion, and patination) are in view of this disclosure.

Wear and tear generally refers to changes in the surface or near-surface conditions that may be seen through electromagnetic interaction. Note that the use of any part of the electromagnetic spectrum is in view of this disclosure, although most of the examples will involve visible light. No particular method of extracting digital fingerprints is required for this disclosure. However, the methods chosen will need to be ones that extract the digital fingerprints from the surface or near-surface features of the material substance of a physical object. In the present disclosure, the term "surface" will mean surface or near-surface.

Wear and tear as defined in this disclosure consists of progressive changes in the surface characteristics of a physical object. The changes may be of many kinds including abrasion, creasing, soiling, aging, oxidizing, physical and/or chemical weathering, or any other progressive change, including intentional changes such as plating. It is not to be implied that changes to an object are necessarily negative or are indications of damage. Some of the embodiments discussed below involve an object "improving" (e.g. bringing the object closer to completion of the manufacturing process). Since digital fingerprints of the type described are derived from surface characteristics of an object, changes in the surface characteristics may be quantified by measuring changes in digital fingerprints of the surface.

In this disclosure, frequent reference will be made to matching a digital fingerprint created at one point in time with a digital fingerprint created at a different point in time and using the degree of match as a component in the system. The matching may be done in various ways. As an example, an embodiment may carry out the matching of a plurality of digital fingerprints by calculating a simple threshold feature vector distance for each point of interest. Those closer than the threshold could be deemed to be a "match". Other known types of calculations may be employed. See the description of Digital Fingerprinting, below, for more detail.

The technology disclosed herein may differentiate between several types of changes in physical objects (based on the way the points of interest change) and provide a measurement not only of overall change but of different types or categories of changes. Some examples, mentioned elsewhere in this disclosure, include distinguishing and measuring additive and subtractive changes separately. Those examples are given but any kind of change that can be isolated based on digital fingerprinting is in view of the taught system.

While this disclosure is not limited to the use of visible light, most of the examples given use visible light. In most instances, the taught technology enables the use of visible light with no special equipment, which means that the hardware required to run the system may in many cases be consumer-level electronics (e.g. a smart phone). The ability to use relatively inexpensive equipment provides a considerable benefit over current approaches, many of which require specialized and often expensive equipment.

Figure 1:
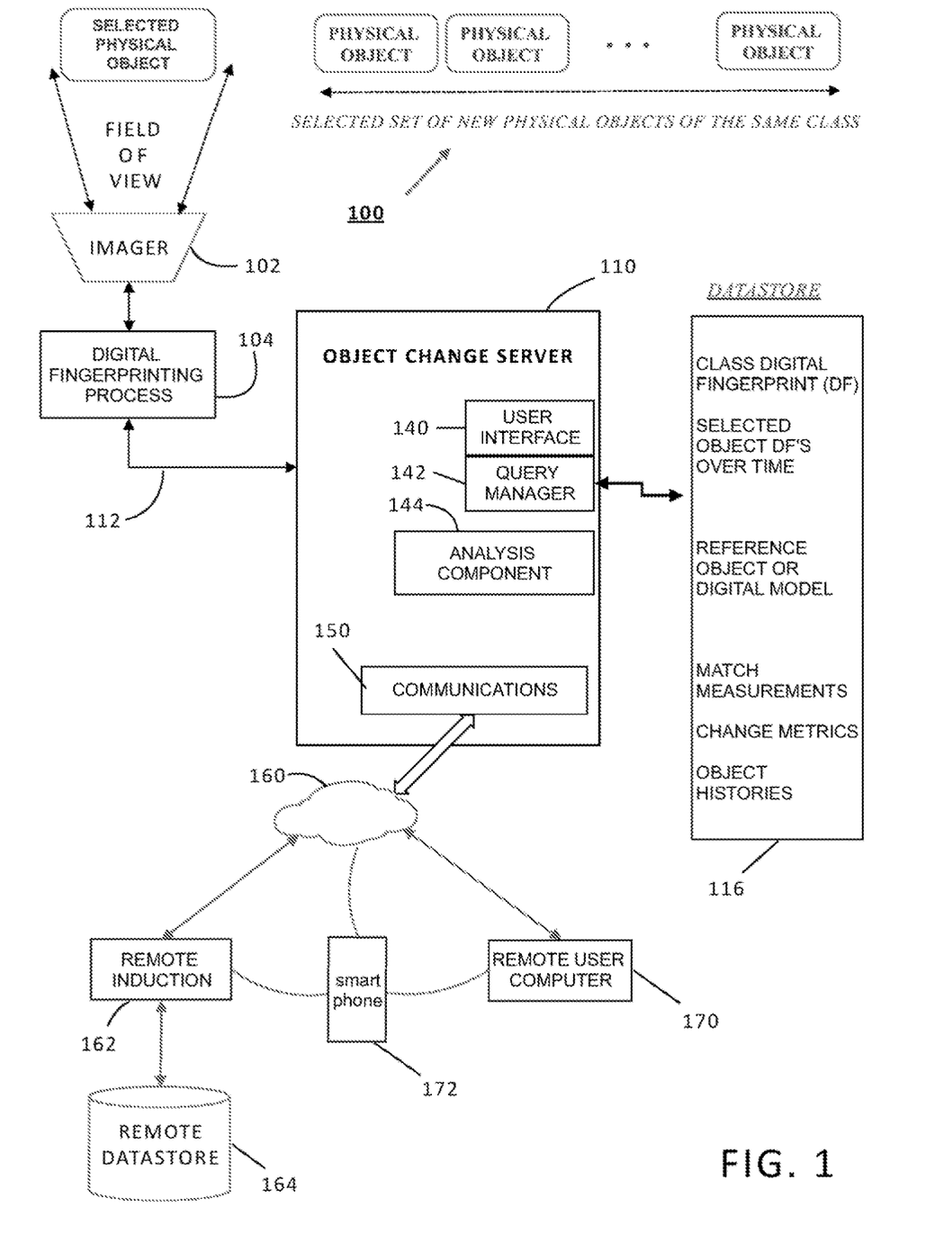
FIG. 1 is a simplified block diagram of one example of a system to detect and measure changes in physical objects using digital fingerprints.

In view in the disclosure is the ability of multiple users at different times and places to contribute to a conceptual map of where (or when, how, why, etc.) changes to an object occur, which may enable a better understanding of the history of the object and for that history to be recorded. For example, the system of FIG. 1 illustrates use of a remote system and smartphone (172) camera to capture image data of a physical object at virtually any time and location. Also, the taught system may enable the detection of places where, for example, excessive wear is occurring, thereby enabling possible fixes. Thus, the teachings of this disclosure may apply throughout a manufacturing process but also through any process (such as a distribution network) wherein the object is handled and may undergo intentional or unintentional change.

FIG. 1 is a simplified block diagram of one example of a system to detect and measure changes in physical objects using digital fingerprints. In this example, a set of physical objects 100 of the same class are collected. The objects are presented one at a time into the field of view of a suitable imager (scanner, camera, etc.) 102 to acquire image data. The image data is input to a digital fingerprinting process 104 to form a digital fingerprint for each object. The digital fingerprinting process 104 may be integrated into the imager, stored in the server 110, etc. It can be a remote process. The resulting set of digital fingerprints are provided via path 112 to an object change server 110. Any suitable computer server can be provisioned to function as an object change server. It may be local or provisioned "in the cloud." In this example, the server 110 is coupled by its communications component 150 to a network 160 which may be LAN, WAN, internet, etc. Almost any digital networking hardware and communication protocols can be used.

A remote induction process 162 may be provisioned and coupled to the server 110 via the network 160. This enables inducting, i.e., capturing image data of an object from a remote location, and adding the corresponding digital fingerprint of the remote object, to the server 110. The server 110 may store digital fingerprint in a coupled datastore 116, which again may be local or provisioned in the cloud. The object change server 110 can store data in the datastore 116 including digital fingerprint data, to accomplish the functions described herein. For example, the datastore can maintain class digital fingerprints, individual (selected object) digital fingerprints, including multiple versions over time; reference object or digital fingerprints or digital models of an object.

The matching process can be carried out, for example, by an analysis component 144. It may use a query manager 142 to access various records as needed in the datastore 116. Results such as match measurements, deterioration metrics, and object histories and be stored and update in the datastore. In one scenario, a remote user 170 may capture an object image using a smartphone 172. The image data can be used to generate a corresponding digital fingerprint, locally on the phone, or in the user system 170, or a remote induction component 162, or at the server 110. The object digital fingerprint can be stored in the datastore. It can be used to query the datastore to find a matching record from an earlier induction. It can be used to compare to that earlier record, to determine changes, and optionally to update the object history.

Objects with Substantially Similar Background Features

Two categories of objects are considered: First, those that are members of a group of similar objects where a substantial portion of the digital fingerprint of an individual object is shared by the similar objects; and second, those objects where there is no such sharing. Whether or not an object shares a "substantial portion" of the digital fingerprint with another may be measured by a threshold value, may be defined by a model or a template, or determined by some other means of measure. Shared or potentially-shared portions of digital fingerprints are, for the purposes of this disclosure, called "background features," although the name is not critical or to be taken literally. In general (though not exclusively) the background features make different members of the group look similar even at fairly detailed levels of examination. A "fairly detailed level of examination" of a physical object may utilize on the order of 5-10× magnification, although these values are not critical. An example of a set of objects that has significant background features are currency bills. In fact, background features are commonly intentionally-added characteristics in paper currency. For example, in the case of a dollar bill, its background features are consistent enough to distinguish a one-dollar bill from a twenty-dollar bill and would include such components as Washington's face and the numerical "1" at the four corners of the bill.

Figure 2:
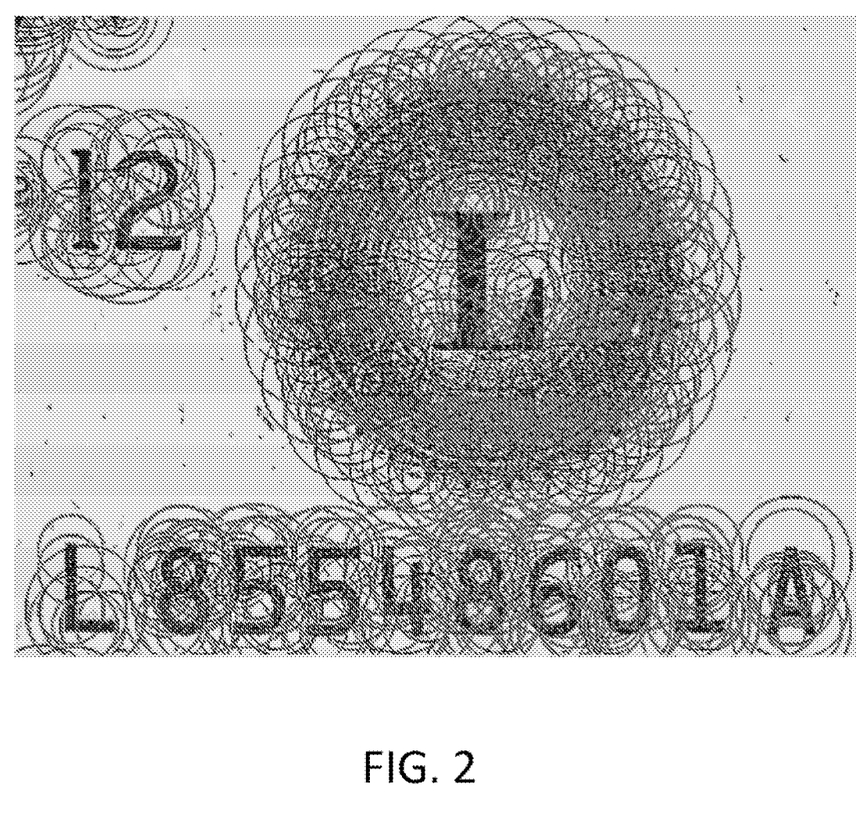
FIG. 2 is an image of a portion of a dollar bill with digital fingerprinting points of interest superimposed as circles on the image.

FIG. 2 is an image of a portion of a dollar bill with digital fingerprinting points of interest identified by superimposed circles on the image. In this example, the points of interest are almost entirely located around "background" features. In one embodiment, the size of an individual superimposed circle reflects the size of the point of interest. That is, the size of the circle is proportional to the scale at which the corresponding point of interest was found. The scale of a point of interest is the size of the radius around a point at which the Laplacian function (used to locate the point of interest) is strongest as one varies the size of the region.

In more detail, in one embodiment, the Laplacian is used to calculate the curvature at each point on the surface. To do this, the Laplacian requires two things: it needs to know the point at its center and it needs to know how far out to look when calculating it. The latter is the "scale" of the Laplacian. One may pass a Laplacian of a given scale over the surface and choose as the location of the points of interest the local (absolute value of the) maximum of the Laplacian. This is done for various scales. At a given point, as the Laplacian scale goes from very small to very large (over a pre-specified range of scales) there is some scale where its absolute value is largest. That value of the scale is then chosen. The point of interest circle indicates that scale.

The examples and descriptions provided here are not meant to be limiting in any way but rather to provide a clear visual of the kind of object being referred to. The digital fingerprints of currency bills often have points of interest whose locations are shared among many such bills and whose characterizing feature vectors are relatively similar as well. The reason for the similarity is that the object has features which are intentional features common to the group of objects and the digital fingerprinting process is finding those common features. In general, such points of interest are close physically (meaning they are located at the same point on each dollar bill) but vary in characterization (since things like paper fibers and ink bleeds cause the feature vectors of extracted digital features to vary significantly).

Objects that do not have Substantially Similar Background Features

The second category is objects that do not have significant shared background features. Machined part surfaces commonly fall into this category. To the naked eye, machined parts may appear to be extremely similar—for example, different brake pads of the same lot—but when viewed at a resolution that on a dollar bill would show, for example, the background features of George Washington's face, such different parts of the same kind show little or no common features. One reason is that, for example, machined part surfaces may consist primarily of casting or machining marks which show little or no commonality across members of the type of object.

Figure 3:
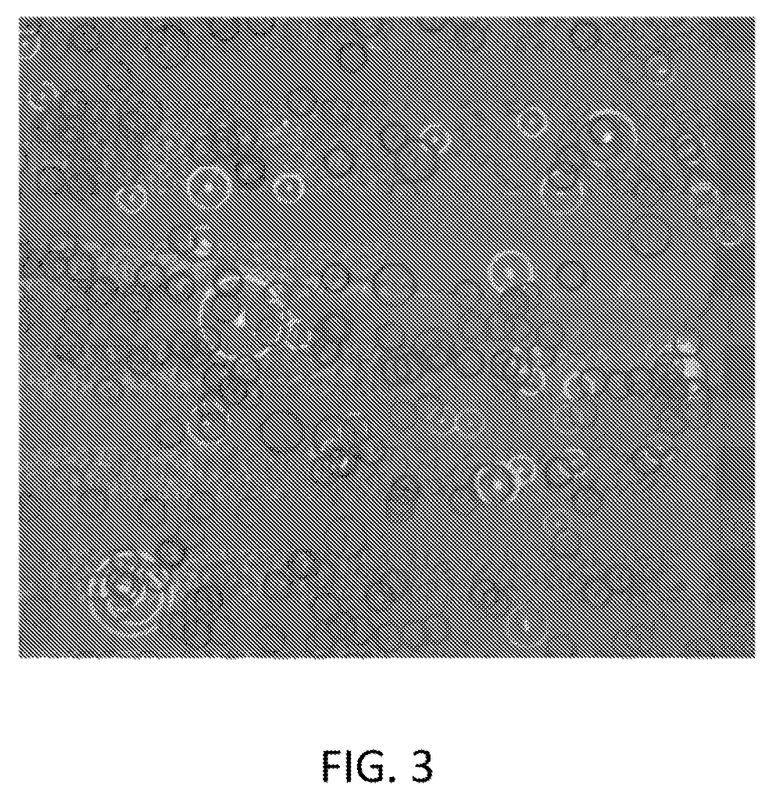
FIG. 3 is an image of a portion of a turbine blade with digital fingerprinting points of interest superimposed as circles on the image.

FIG. 3 is an image of a portion of a turbine blade with digital fingerprinting points of interest superimposed as circles on the image. The image shows a section of a turbine blade. With very few exceptions, all the points marked on the photo are characteristics of the surface of the individual blade and not of a class of turbine blades. Very few exceptions may be seen along the dark line across the image. In many cases it is obvious what surface features are responsible for the point of interest. In this case, essentially all the points of interest are independent in both position and value (though obviously tied to the surface of the object). They are useful in identifying the individual turbine blade but useless in determining that the object is a turbine blade. Essentially all points of interest are dissimilar or "foreground" features.

In some embodiments, the image may be displayed in color to provide more information. The dark line is actually in the image. In one example, a first color may be used to display circles that are above a certain strength or threshold value ("strong points of interest"), while a second color may be used to show weaker points of interest, i.e., those below the threshold value. In another example, additional colors, for example, four or five colors, may be applied to points of interest circles in a visual display to show a (quantized) range of strength values. The "strength" of a point of interest is correlated to the ability to find it under different conditions of angle and illumination. The use of visual displays including circles (or other shapes), colors, etc. may help human users to understand the computerized processes at work.

Two different processes for detecting and measuring changes to an object are described in more detail below. Which process to apply depends on the category of objects to be considered. It should be kept in mind that while two distinct categories are described herein, in practice, objects generally fall within a range from one to the other. One example is coin grading, where both addition and subtraction may be equally important. While different approaches are described for the two categories, it is anticipated that for many objects a combination of approaches will be required.

The system taught herein works when the change is negative or subtractive—such as when parts of the surface abrade—as well as when the change is additive. In either case, the match with the reference digital fingerprint will degrade. In the former case, degradation is caused by removal of the surface feature that was characterized as a point of interest in the reference fingerprint. In the latter case, that surface feature has been covered over by an additive process.

In one embodiment of this disclosure, features common to multiple examples of a class of objects are identified and common points of interest are identified and characterized and then used for determining changes in members of that class of objects. At different times in the object's life cycle its digital fingerprint is compared with the digital fingerprint composed of the common points of interest and the change in correspondence to those common points measured and used as a measurement of the change in the object. This is particularly useful when the object being measured was not inducted (i.e. digitally fingerprinted) when new.

One advantage of the approach of using common points is the ability to produce a degradation measuring system that does not require that a particular object (of this kind) be inducted as a reference. Instead of measuring degradation of a particular object from its earlier induction, the degradation in the object's match with a group digital fingerprint comprising the common points is measured. An example of this type of process follows.

Figure 5:
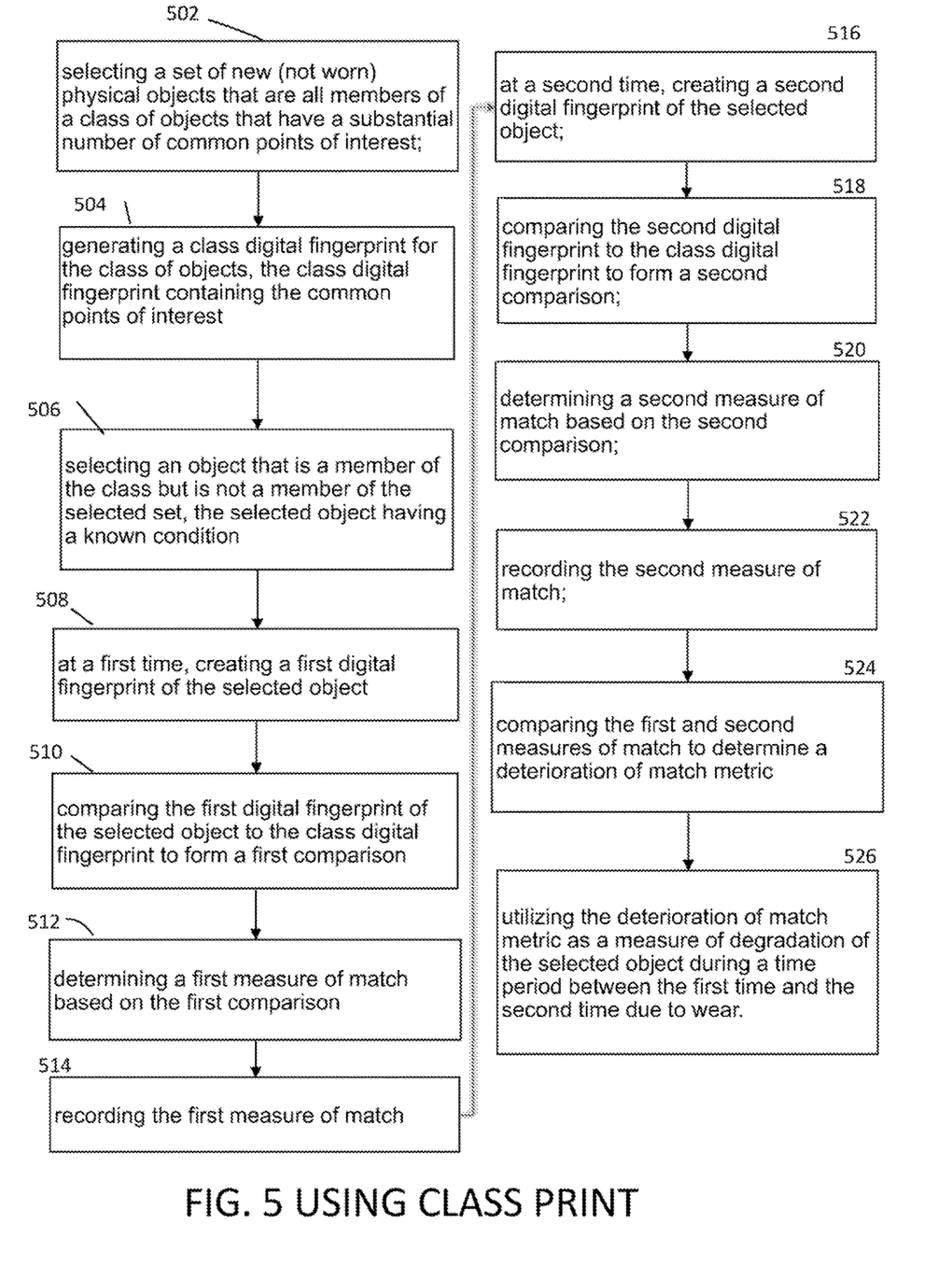
FIG. 5 is a simplified flow diagram of a second process to detect and measure degradation in physical objects using digital fingerprints.

Process for a Class of Objects with a Substantial Number of Common Points of Interest FIG. 5 is a simplified flow diagram of a method to detect and measure degradation in physical objects using digital fingerprints. A set of, preferably, new objects (although it is not strictly necessary that the objects be new) that are all members of a class with a substantial number of common points is selected, block 502. The size of the set is chosen such that adding more members does not significantly increase the number of common points. Each member object of the set is inducted, and its digital fingerprint is extracted. Though the digital fingerprint may contain many additional types of information, for the purposes of this disclosure, points of interest that have (up to invariances) the same, or very similar, location in multiple members of the class are considered. The exact number of times the point will occur in the class depends on the number of objects in the class-specific data set and the consistency and constitution of the background, but it has been found that, typically, if a point occurs in more than 14 members of such a class, it is likely to occur in a great deal more (if the class is large enough) and therefore is considered a common or "background" point or feature.

Meaning of "up to invariances". It was stated above that the common points are in the same (or very similar) locations "up to invariances". What this means depends on the type of invariance that the processing of the object achieves. Consider a dollar bill as an example. If an image of a dollar bill is always captured in the same orientation and with the same resolution, the common points of the dollar bill class will be in very nearly the same location in each image. If, however, the bill may be imaged in any orientation, the location of the common points is "the same" after correcting for the degree of rotation between member of the class. If the image can be captured at different resolutions, the common points are located in "the same location" up to a change in scale. Similar statements can be made for offset, affine, homography, projective, perspective, rubber sheet, and other variations. A point on one object is considered to be "in the same location" as a point on another object of the same class if, when a matching of digital fingerprints is performed, they are considered to be properly located for a match. In this description, when it is stated that two points on different class members are located in the same place, "up to invariances" should always be understood to be implied.

Now that a set of common points of interest are defined, a "class digital fingerprint" (or simply, "class fingerprint") can be generated, so that the class fingerprint contains, preferably only, the common points of interest, block 504. The class fingerprint can be used for matching an object to a class (that is, for determining that a particular object is a member of a particular class whose class fingerprint the fingerprint of the object matches within a threshold). That is an important use, but it is not directly relevant to this section of the description. The class fingerprint may have all the points found (including, say, 15 of each located very close to each other), an average of the characteristics of each such point, or any other way of combining them. Significantly, when the process is completed, the outcome will include a set of points, many of which are likely to occur in any example of the object class.

For some applications, the selected set of objects should be objects that are as close as possible to a desired reference state. In many cases the preferred reference state will be "new", but in the case of an object inducted previously in its life cycle, the reference state might be the same object (that is, the digital fingerprint of the same object) acquired and stored at an initial or earlier induction. As mentioned, the objects are compared with each other and the points of interest that are common to a significant number of them are preserved in a class fingerprint.

One benefit of having background features and using them to create a class fingerprint is that the degree of change of a member of the class may be determined without the individual object having been inducted when it was new. However well or poorly it matches the class fingerprint (compared to how well other items known to be worn out or in good condition matched and/or compared with its previous matches), measures the degree of wear.

Referring again to FIG. 5, next, a member of the class that was not part of the original set is selected, block 506. This selected member should preferably be in a known condition, preferably in "new" condition, although any condition may be of use. A (first) digital fingerprint of the selected member is acquired, block 508. That digital fingerprint is compared to the class fingerprint, block 510 and a measure of match is determined based on the comparison, block 512, and recorded, block 514. As the selected member experiences wear and tear, it is repeatedly measured against the class fingerprint. In FIG. 5, see block 516, creating a second digital fingerprint at a second time. Comparing the second digital fingerprint to the class digital fingerprint, block 518; determining a second measure of match, block 520; recording the second measure of match, block 522; and comparing the first and second measures of match to determine a deterioration of match metric, block 524.

The deterioration of the selected member's match to the class fingerprint is used as a measure or metric of its degree of change, see block 526. Determining that the object is worn out may either be done by training—that is, by seeing how much degradation other objects in the class have undergone before a human decides they are worn out—or by a predetermined loss of matching points between the object and the class digital fingerprint, or by some other method. When a sufficiently high level of degradation occurs in a tested object, the object is declared to be worn out. These processes may be realized in software, for example, in an analysis component 144 in the object change server 110 in FIG. 1.

Process for a Class of Objects without a Substantial Number of Common Points of Interest In an embodiment an object is inducted when new (or other known state) and measurement of its change is based on how its own digital fingerprint changes from the originally-inducted one. That digital fingerprint may comprise only those points of interest that occur in this object (and not in similar objects) or it may comprise all points of interest on the object, or, comprise different subsets of such points.

It should be kept in mind that this approach may be used for any object whether or not it belongs to a class that has common points. It is possible the use of common points of interest (in the former embodiment) as well as individual object points of interest in a given application.

When there are few or no "common features" or "background features" creating a class digital fingerprint is impossible, so the approach of the previous section is also impossible. When everything is foreground (or treated as though it were foreground), the object must be inducted when the object is in a known condition, preferably when it is new, although any condition may be acceptable. Change, therefore, is measured as the change from the originally-inducted digital fingerprint. A turbine blade is one example, but this approach works for almost any object, including those with substantial background points or features.

In this case an object is inducted when in a known condition, preferably in "new" condition for measuring degradation, or, as another example, "prior to anodizing" if anodizing will be taking place, and so on. Later, when the object has been worn or anodized or otherwise altered, the object is inducted again to measure the difference in match points from when it was initially inducted.

Figure 4:
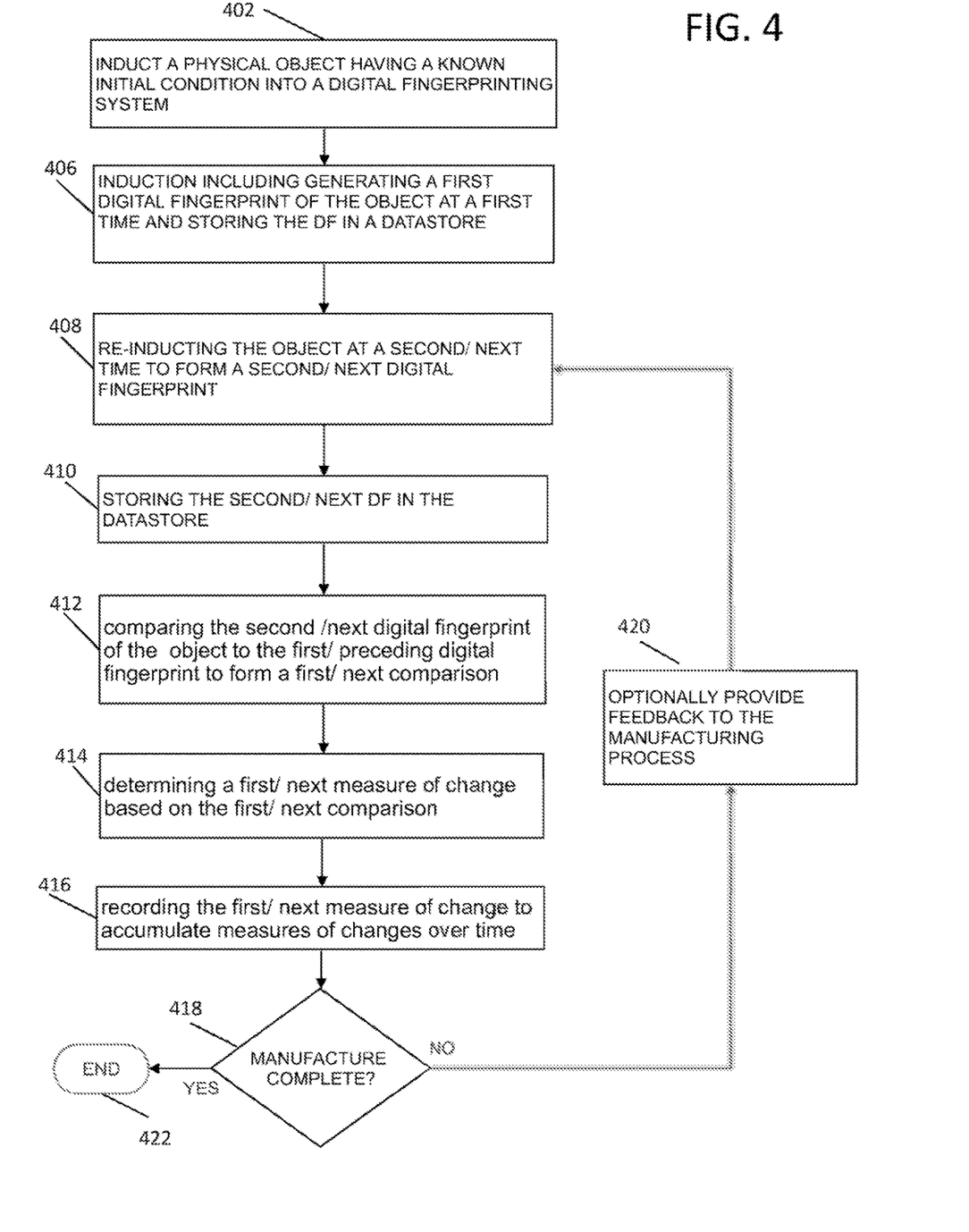
FIG. 4 is a simplified flow diagram illustrating a first process to detect and measure degradation in physical objects using digital fingerprints.

FIG. 4 is a simplified flow diagram illustrating a method to detect and measure degradation in physical objects using digital fingerprints, without a class digital fingerprint. At block 402, the process calls for inducting a physical object in a known initial condition into a digital fingerprinting system. Inducting the physical object includes generating and storing a first digital fingerprint of the object at a first time, block 406. This may be called a reference digital fingerprint. Next comes re-inducting the object at a second or next time after the first time, to form a second or next digital fingerprint of the object, block 408. The second or next digital fingerprint is stored in the datastore, block 410. In this description and the claims, phrases like "a second/next digital fingerprint" and "a first/next comparison" etc. are used to indicate a repeating process, where the "next digital fingerprint" for example, would correspond to a second, third, fourth, etc. digital fingerprint as a repeating process or "loop" is executed. Such a loop is indicated in FIG. 4 from the decision 418 back to block 408.

At block 412, the process continues by comparing the second/next digital fingerprint of the object to a first/next preceding digital fingerprint to form a first/next comparison. Block 414 calls for determining a first/next measure of change of the object between the first/next time and the second/next subsequent time based on the first/next comparison. Block 416 calls for recording the first/next measure of change to accumulate measures of change of the object over time, namely, from the first time to the last (most recent) next time.

A decision 418 determines whether the manufacturing process has completed. If so, the process may terminate, block 422. If not, the illustrated method may provide feedback to the manufacturing process, block 420. That is, it may provide information based on changes to the object during the manufacturing process. for example, if a plating process is specified to continue until a certain measure of change is accomplished, the feedback may indicate that the measure of change has occurred and thus the plating process is completed. Assuming the process is not completed, the method loops back to block 408 to again re-induct the object.

Training

Determining how much measured change is sufficient to, say, remove a bill or turbine blade from service or show that the anodizing process has been successful can be done in various ways, any of which are in view in this disclosure. Two approaches are worth highlighting. First, a degree of change of the test digital fingerprint from the reference one may be set. To use the wear-and-tear example of a turbine blade, when, for example, half the points originally seen are no longer there to match the reference, that level of change may be defined as a prompt to replace the blade. This makes sense because half the points missing is indicative of half the surface having been substantially altered. In category one (the category with a large number of background points) it is indicative that half the points that make the object a dollar bill (or whatever) are missing so it may be time to recycle the bill. Note that the use of "half" here is purely arbitrary. The number of points may be set at any level and by any manner, including manually, as a result of experience, as a result of a training process, or by any other method.

The training process approach involves training the system to determine the action to take based on a given degree of change. Again, the wear and tear surface erosion example will be used, but the example is not meant to be limiting. One way to do the training is to induct a set of objects and follow them through their life cycle, measuring them as time passes until they are ready to be replaced. The degradation score at their points of replacement (or the aggregate or average of such scores) may then be used to define a norm or a standard. A more sophisticated training system may be envisioned where a neural net or other machine learning system is trained with objects at various parts of their life cycles and, after the training cycle is complete, the match of the object to the class digital fingerprint (first category) or to its initial induction (second category) is put into the learning system and the system indicates, for example, how much life is left in the object or that it is time to replace the object. A similar training system may be envisioned for use in additive processes as well.

Non-Limiting Sample Use Cases

In addition to the currency bill and turbine blade examples explored above, many other embodiments are possible. The teachings of this disclosure apply wherever measurement of change in the surface features of a physical object is useful.

Plating. In addition to anodizing, mentioned above, other methods of obscuring the surface are in view. The obscuring may be unintentional or intentional. Plating is one example. Depending on how thick the plating is supposed to be, the object may be inducted once or many times in the plating process.

In an embodiment, an object's surface may need to be covered with new material that is too thick to see through. There are two uses for digital fingerprinting here. First, the teachings of this disclosure can be used to determine the progress and effectiveness of such additions. In this case, each time the previous surface "disappears" to some predetermined amount, the object is re-inducted, and a new reference preserved. When that surface in turn partially "disappears", further induction is performed and so on until the addition process is complete. The second use is to re-induct the part when the new surface is finished so that, going forward, the part's identity can be established. As such, in this embodiment the teachings of this disclosure are used to both ensure the additive process is working correctly and, when that process is finished, to ensure that the system can continue to identify the part as it moves through further manufacturing stages.

Item aging. Aging here is a stand-in term for conditions where the object changes not because it is added to or abraded but simply as a result of the passage of time, its interaction with the environment, its regrowth/regeneration (such as in the case of skin or living material), and so on. In this case, surface points may be added or subtracted by the aging process and the degree of change measured not just in terms of points of interest lost but also points of interest that first appear between inductions.

Coin (and other object) grading. Many objects are graded to determine how closely they conform to a standard object. Coins are examples of this. In general, the more the coin is worn (in the case of circulated coins) or scarred by, say, other coins in a bag (uncirculated coins), the less well they will conform.

Coins are graded somewhat differently depending on their type. Proof coins are (generally) double stamped and stamped with mirrored dies. They are not meant for general circulation. Proof coins are graded from PR-60 to PR-70 (impaired or rubbed proof coins may have a lower grade). Uncirculated regular coins are coins that have never been in general circulation. Uncirculated coin grades run from MS-60 to MS-70, which correspond in quality and amount of degradation to the PR categories for proof coins.

Coins that have been in general circulation are graded in a range from 1 to 59. 50 and up are called "about uncirculated" (AU). 40-49 are "extremely fine" (XF). 20-39 are "very fine" (VF). Below that are "fine" (F), "very good" (VG), "good" (G), "about good" (AG), "fair" (FR), "poor" (P), and "ungradable". Examples are given below.

Coins fit into the first category of objects with similar background features, described above as coins have a large quantity of shared "background" points. It is clear from the images that degradation from initial conditions depends on both addition (patina, scratch marks) and subtraction (wear marks). The taught system may be used to carry out coin grading by having coins graded by an expert and the digital fingerprint of the coins extracted. A learning system is then programmed based on the grade and the measured change from an ideal example of that coin type. When a coin of that type is to be graded, its digital fingerprint is extracted and additions and subtractions from the standard measured, the results fed through the learning system, and the grade produced.

Digital Fingerprinting

"Digital fingerprinting" refers to the creation and use of digital records (digital fingerprints) derived from properties of a physical object, which digital records are typically stored in a database. Digital fingerprints may be used to reliably and unambiguously identify or authenticate corresponding physical objects, track them through supply chains, record their provenance and changes over time, and for many other uses and applications.

Digital fingerprints store information, preferably in the form of numbers or "feature vectors," that describes features that appear at particular locations, called points of interest, of a two-dimensional (2-D) or three-dimensional (3-D) object. In the case of a 2-D object, the points of interest are preferably on a surface of the corresponding object; in the 3-D case, the points of interest may be on the surface or in the interior of the object. In some applications, an object "feature template" may be used to define locations or regions of interest for a class of objects. The digital fingerprints may be derived or generated from digital data of the object which may be, for example, image data.

While the data from which digital fingerprints are derived is often images, a digital fingerprint may contain digital representations of any data derived from or associated with the object. For example, digital fingerprint data may be derived from an audio file. That audio file in turn may be associated or linked in a database to an object. Thus, in general, a digital fingerprint may be derived from a first object directly, or it may be derived from a different object (or file) linked to the first object, or a combination of the two (or more) sources. In the audio example, the audio file may be a recording of a person speaking a particular phrase. The digital fingerprint of the audio recording may be stored as part of a digital fingerprint of the person speaking. The digital fingerprint (of the person) may be used as part of a system and method to later identify or authenticate that person, based on their speaking the same phrase, in combination with other sources.

Returning to the 2-D and 3-D object examples mentioned above, feature extraction or feature detection may be used to characterize points of interest. In an embodiment, this may be done in various ways. Two examples include Scale-Invariant Feature Transform (or SIFT) and Speeded Up Robust features (or SURF). Both are described in the literature. For example: "Feature detection and matching are used in image registration, object tracking, object retrieval etc. There are number of approaches used to detect and matching of features as SIFT (Scale Invariant Feature Transform), SURF (Speeded up Robust Feature), FAST, ORB etc. SIFT and SURF are most useful approaches to detect and matching of features because of it is invariant to scale, rotate, translation, illumination, and blur." MISTRY, Darshana et al., *Comparison of Feature Detection and Matching Approaches: SIFT am SURF*, GRD Journals—Global Research and Development Journal for Engineering|Volume 2|Issue 4|March 2017.

In an embodiment, features may be used to represent information derived from a digital image in a machine-readable and useful way. Features may be point, line, edges, and blob of an image etc. There are areas as image registration, object tracking, and object retrieval etc. that require a system or processor to detect and match correct features. Therefore, it may be desirable to find features in ways that are invariant to rotation, scale, translation, illumination, noisy and blur images. The search of interest points from one object image to corresponding images can be very challenging work. The search may preferably be done such that same physical interest points can be found in different views. Once located, points of interest and their respective characteristics may be aggregated to form the digital fingerprint (generally including 2-D or 3-D location parameters).

In an embodiment, features may be matched, for example, based on finding a minimum threshold distance. Distances can be found using Euclidean distance, Manhattan distance etc. If distances of two points are less than a prescribed minimum threshold distance, those key points may be known as matching pairs. Matching a digital fingerprint may comprise assessing a number of matching pairs, their locations or distance and other characteristics. Many points may be assessed to calculate a likelihood of a match, since, generally, a perfect match will not be found. In some applications an "feature template" may be used to define locations or regions of interest for a class of objects.

Scanning

In this application, the term "scan" is used in the broadest sense, referring to any and all means for capturing an image or set of images, which may be in digital form or transformed into digital form. Images may, for example, be two dimensional, three dimensional, or in the form of a video. Thus a "scan" may refer to an image (or digital data that defines an image) captured by a scanner, a camera, a specially adapted sensor or sensor array (such as a CCD array), a microscope, a smartphone camera, a video camera, an x-ray machine, a sonar, an ultrasound machine, a microphone (or other instruments for converting sound waves into electrical energy variations), etc. Broadly, any device that can sense and capture either electromagnetic radiation or mechanical wave that has traveled through an object or reflected off an object or any other means to capture surface or internal structure of an object is a candidate to create a "scan" of an object. Various means to extract "fingerprints" or features from an object may be used; for example, through sound, physical structure, chemical composition, or many others. The remainder of this application will use terms like "image" but when doing so, the broader uses of this technology should be implied. In other words, alternative means to extract "fingerprints" or features from an object should be considered equivalents within the scope of this disclosure. Similarly, terms such as "scanner" and "scanning equipment" herein may be used in a broad sense to refer to any equipment capable of carrying out "scans" as defined above, or to equipment that carries out "scans" as defined above as part of their function.

More information about digital fingerprinting can be found in various patents and publications assigned to Alitheon, Inc. including, for example, the following: DIGITAL FINGERPRINTING, U.S. Pat. No. 8,6109,762; OBJECT IDENTIFICATION AND INVENTORY MANAGEMENT, U.S. Pat. No. 9,152,862; DIGITAL FINGERPRINTING OBJECT AUTHENTICATION AND ANTI-COUNTERFEITING SYSTEM, U.S. Pat. No. 9,443,298; PERSONAL HISTORY IN TRACK AND TRACE SYSTEM, U.S. Pat. No. 10,037,537; PRESERVING AUTHENTICATION UNDER ITEM CHANGE, U.S. Pat. App. Pub. No. 2017-0243230 A1. These references are incorporated herein by this reference.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present disclosure, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The disclosures may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.)

to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the present disclosure or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the present disclosure, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the present disclosure have been specifically described herein, it will be apparent to those skilled in the art to which the present disclosure pertains that variations and modifications of the various implementations shown and described herein may be made without departing from the spirit and scope of the present disclosure. Accordingly, it is intended that the present disclosure be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A processor-based system to assess objects that may change over time during manufacturing, the processor-based system comprising:
   at least one processor; and
   at least one nontransitory processor-readable medium communicatively coupled to the at least one processor, the at least one nontransitory processor-readable medium which stores a dataset and at least one set of processor-executable instructions, the dataset which includes at least one reference digital fingerprint that represents the object under assessment in a known condition at a time prior to a time of assessment or that represents a number of other objects in a known condition at a time prior to the time of assessment, the number of other objects each being a same type of object the object under assessment, the processor-executable instructions which, when executed by the at least one processor, cause the at least one processor to:
   for a digital fingerprint of an object under assessment wherein the digital fingerprint represents the object under assessment at the time of assessment of the object,
   compare the digital fingerprint of the object under assessment with the at least one reference digital fingerprint that represents the object under assessment in the known condition at the time prior to the time of assessment or that represents the number of other objects in the known condition at the time prior to the time of assessment;

determine at least one metric that represents a measure of change in the object under assessment based on the comparison;

determine whether at least one manufacturing operation of a set of manufacturing operations being performed on the object under assessment is complete based at least in part on the determined measure of change in the object under assessment;

update the dataset to reflect the determined at least one metric that represents the measure of change in the object under assessment; and repeatedly update the dataset to reflect the determined at least one metric that represents the measure of change in the object under assessment for a plurality of successive times following the first time of assessment, to accumulate measures of change in the object under assessment over time.

2. The processor-based system of claim 1 wherein, when executed by the at least one processor, the processor-executable instructions cause the at least one processor further to:
in response to a determination that at least one manufacturing operation of the set of manufacturing operations being performed on the object under assessment is complete, cause at least one tool to cease performing the manufacturing operation.

3. The processor-based system of claim 1 wherein, when executed by the at least one processor, the processor-executable instructions cause the at least one processor further to:
in response to a determination that at least one manufacturing operation of the set of manufacturing operations being performed on the object under assessment is complete, cause at least one tool to cease performing a subtractive manufacturing operation.

4. The processor-based system of claim 1, further comprising:
in response to a determination that at least one manufacturing operation of the set of manufacturing operations being performed on the object under assessment is complete, causing at least one tool to cease performing an additive manufacturing operation.

5. The processor-based system of claim 1 wherein, when executed by the at least one processor, the processor-executable instructions cause the at least one processor further to:
in response to determining whether at least one manufacturing operation of a set of manufacturing operations being performed on the object under assessment is complete, provide feedback to a manufacturing process.

6. The processor-based system of claim 1 wherein to compare the digital fingerprint of the object under assessment with the at least one reference digital fingerprint that represents the object under assessment in the known condition at the time prior to the time of assessment or that represents the number of other objects in the known condition at the time prior to the time of assessment the at least one processor: compares the digital fingerprint of the object under assessment with two or more reference digital fingerprints that respectively represent the object under assessment in respective ones of two or more known conditions at respective times during the manufacturing process which occur prior to the time of assessment.

7. The processor-based system of claim 1 wherein to compare the digital fingerprint of the object under assessment with the at least one reference digital fingerprint that represents the object under assessment in the known condition at the time prior to the time of assessment or that represents the number of other objects in the known condition at the time prior to the time of assessment the at least one processor: compares the digital fingerprint of the object under assessment the reference digital fingerprint that respectively represents a class of object, the reference digital fingerprint which represents a set of two or more of the other objects in the known condition at the time during the manufacturing processor that occurs prior to the time of assessment.

8. The processor-based system of claim 1 wherein the dataset includes at least one class reference digital fingerprint that represents a class of object, the reference digital fingerprint which represents a set of two or more of the other objects in the known condition at the time during the manufacturing processor that occurs prior to the time of assessment.

9. The processor-based system of claim 1 wherein the dataset includes at least one reference digital fingerprint that comprises at respective feature vector for each of a plurality of points of interest captured from the object under assessment in a respective known condition at each of one or more times prior to the time of assessment.

10. The processor-based system of claim 1 wherein the dataset includes at least one reference digital fingerprint that comprises at respective feature vector for each of a plurality of points of interest captured from two or more other objects in a respective known condition at a time prior to the time of assessment.

11. The processor-based system of claim 1 wherein to compare the digital fingerprint of the object under assessment with the at least one reference digital fingerprint that represents the number of other objects in the known condition at the time prior to the time of assessment the at least one processor: for each point of interest, determines, a corresponding feature vector distance between the feature vector for the respective point of interest of the at least one reference digital fingerprint and a feature vector for the respective point of interest of the digital fingerprint of the object under assessment.

12. The processor-based system of claim 1 wherein to determine at least one metric that represents a measure of change in the object under assessment based on the comparison the at least one processor: determine a total number of points of interests of the digital fingerprint of the object under assessment that match respective point of interest of the at least one reference digital fingerprint.

13. A method of operation of a processor-based system to assess objects that may change over time during manufacturing, the method comprising:
receiving a digital fingerprint of an object under assessment wherein the digital fingerprint represents the object under assessment at a first time of assessment of the object;

accessing a stored dataset that includes at least one reference digital fingerprint that represents the object under assessment in a known condition at a time prior to the first time of assessment or that represents a number of other objects in a known condition at a time prior to the first time of assessment, the number of other objects each being a same type of object as the object under assessment;

comparing, via at least one processor, the digital fingerprint of the object under assessment with the at least one reference digital fingerprint that represents the object under assessment in the known condition at the time prior to the first time of assessment or that represents the number of other objects in the known condition at the time prior to the first time of assessment;

determining, via at least one processor, at least one metric that represents a measure of change in the object under assessment based on the comparison;

determining whether at least one manufacturing operation of a set of manufacturing operations being performed on the object under assessment is complete based at least in part on the determined measure of change in the object under assessment;

updating the dataset to reflect the determined at least one metric that represents the measure of change in the object under assessment; and repeatedly updating the dataset to reflect the determined at least one metric that represents the measure of change in the object under assessment for a plurality of successive times following the first time of assessment, to accumulate measures of change in the object under assessment over time.

14. The method of claim 13, further comprising:

in response to a determination that at least one manufacturing operation of the set of manufacturing operations being performed on the object under assessment is complete, causing at least one tool to cease performing the manufacturing operation.

15. The method of claim 13, further comprising:

in response to a determination that at least one manufacturing operation of the set of manufacturing operations being performed on the object under assessment is complete, causing at least one tool to cease performing a subtractive manufacturing operation.

16. The method of claim 13, further comprising:

in response to a determination that at least one manufacturing operation of the set of manufacturing operations being performed on the object under assessment is complete, causing at least one tool to cease performing an additive manufacturing operation.

17. The method of claim 13, further comprising:

in response to determining whether at least one manufacturing operation of a set of manufacturing operations being performed on the object under assessment is complete, providing feedback to a manufacturing process.

18. The method of claim 13 wherein comparing the digital fingerprint of the object under assessment with the at least one reference digital fingerprint that represents the object under assessment in the known condition at the time prior to the first time of assessment or that represents the number of other objects in the known condition at the time prior to the first time of assessment includes: comparing the digital fingerprint of the object under assessment with two or more reference digital fingerprints that respectively represent the object under assessment in respective ones of two or more known conditions at respective times during the manufacturing process which occur prior to the first time of assessment.

19. The method of claim 13 wherein comparing the digital fingerprint of the object under assessment with the at least one reference digital fingerprint that represents the object under assessment in the known condition at the time prior to the first time of assessment or that represents the number of other objects in the known condition at the time prior to the first time of assessment includes: comparing the digital fingerprint of the object under assessment the reference digital fingerprint that respectively represents a class of object, the reference digital fingerprint which represents a set of two or more of the other objects in the known condition at the time during the manufacturing processor that occurs prior to the first time of assessment.

20. The method of claim 13 wherein accessing a stored dataset includes assessing a stored dataset that includes at least one class reference digital fingerprint that represents a class of object, the reference digital fingerprint which represents a set of two or more of the other objects in the known condition at the time during the manufacturing processor that occurs prior to the first time of assessment.

21. The method of claim 13 wherein accessing a stored dataset includes assessing a stored dataset that includes at least one reference digital fingerprint that comprises at respective feature vector for each of a plurality of points of interest captured from the object under assessment in a respective known condition at each of one or more times prior to the first time of assessment.

22. The method of claim 13 wherein accessing a stored dataset includes assessing a stored dataset that includes at least one reference digital fingerprint that comprises at respective feature vector for each of a plurality of points of interest captured from two or more other objects in a respective known condition at a time prior to the first time of assessment.

23. The method of claim 13 wherein comparing the digital fingerprint of the object under assessment with the at least one reference digital fingerprint that represents the number of other objects in the known condition at the time prior to the first time of assessment includes: for each point of interest, determining, a corresponding feature vector distance between the feature vector for the respective point of interest of the at least one reference digital fingerprint and a feature vector for the respective point of interest of the digital fingerprint of the object under assessment.

24. The method of claim 13 wherein determining at least one metric that represents a measure of change in the object under assessment based on the comparison includes determining a number of points of interests of the digital fingerprint of the object under assessment that match respective point of interest of the at least one reference digital fingerprint.

* * * * *